W. Mason,
Spinning Mach.
No. 724.   Patented May 4, 1838.
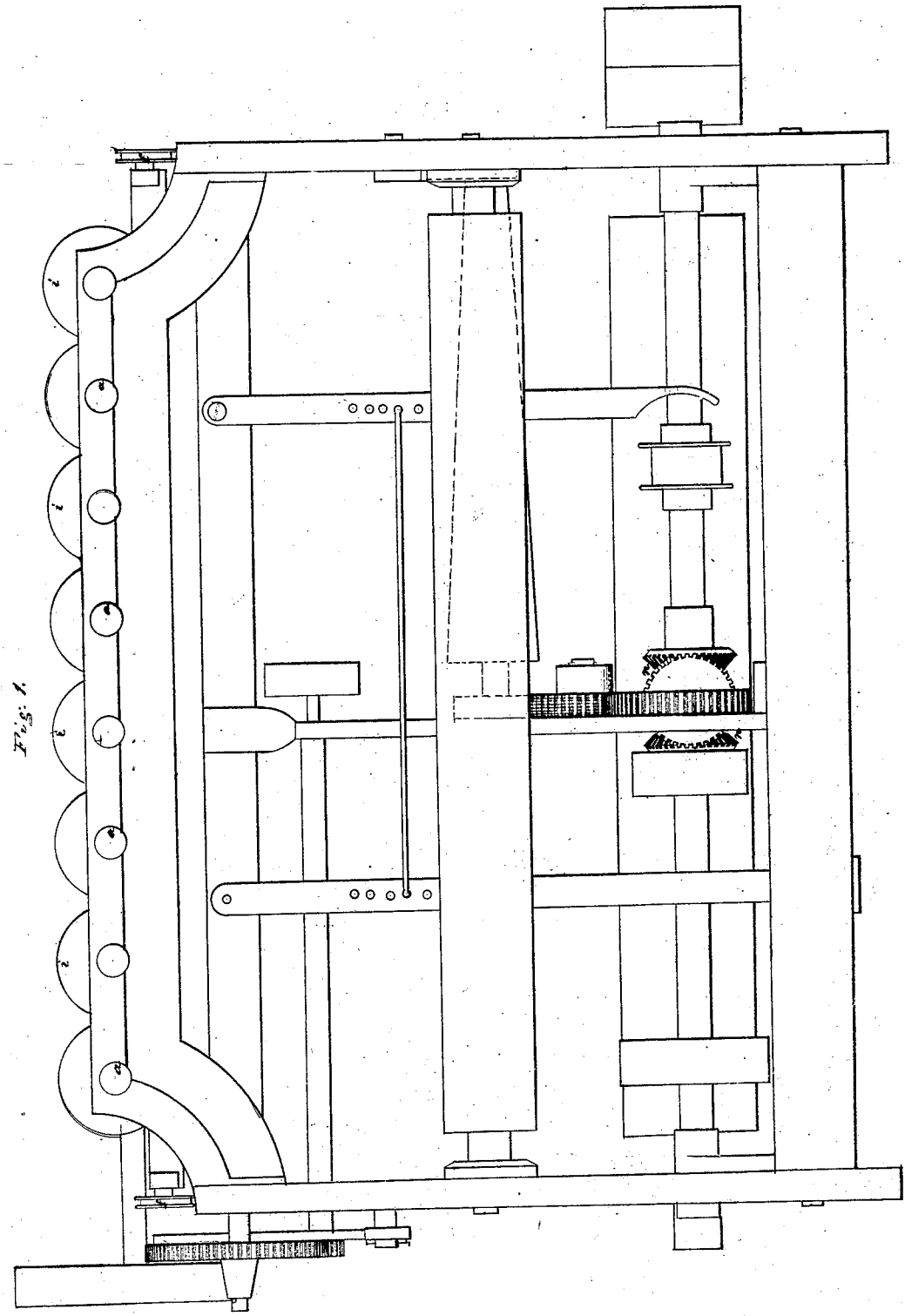

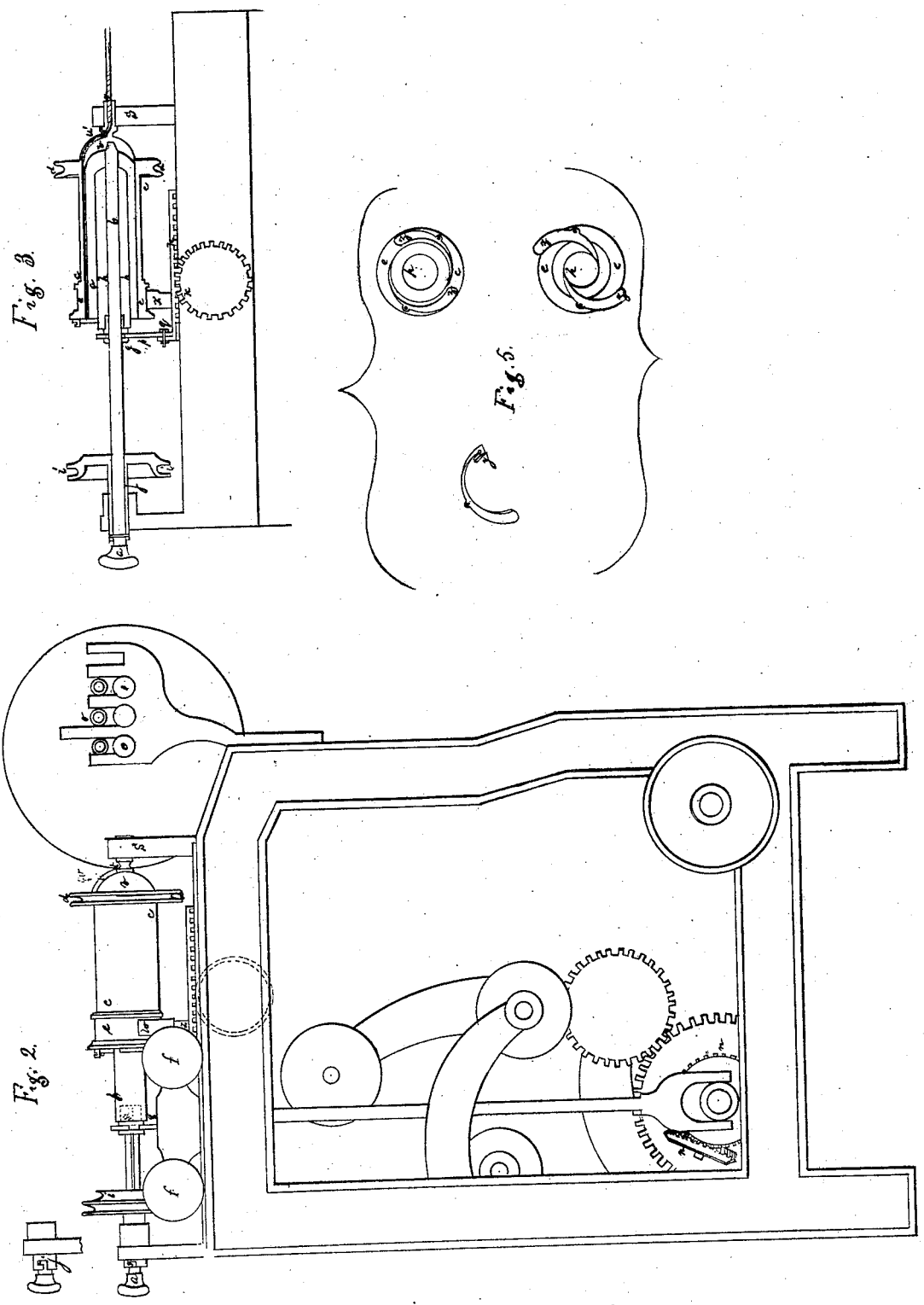

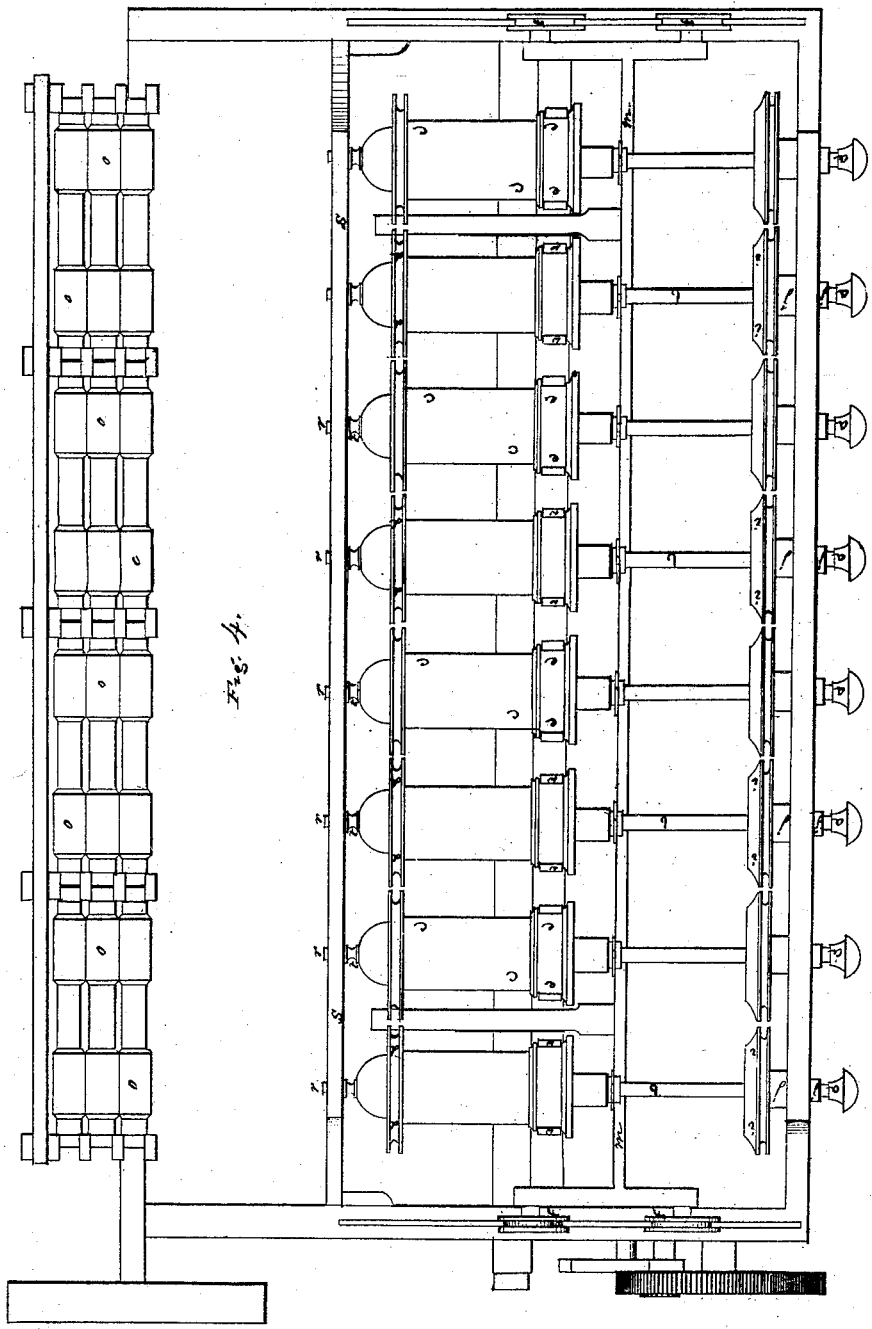

UNITED STATES PATENT OFFICE.

WM. MASON, OF TAUNTON, MASSACHUSETTS.

SPEEDER FOR ROVING COTTON.

Specification of Letters Patent No. 724, dated May 4, 1838.

*To all whom it may concern:*

Be it known that I, WILLIAM MASON, of Taunton, in the county of Bristol and State of Massachusetts, have made certain Improvements in what I denominate the "Horizontal Spindle-Compressing Speeder;" and I do hereby declare that the following is a full and exact description thereof.

In order to make my improvements fully known, and to show what I deem a convenient manner of connecting them with the other parts of the speeder, it will be necessary for me to give a general arrangement of the moving parts of the machine, although I do not make any claim thereto; nor do I intend thereby to limit myself to such an arrangement, but to employ any other which is compatible with the improvements which I have made.

In the accompanying drawings Figure 1. represents a back view of a portion of the machine, $a$, $a$, $a$, being the heads of the spindles to be presently described. The drum, cones, pulleys, and general gearing not presenting anything peculiar I do not describe. Fig. 2. is an end view thereof, Fig. 3. a vertical section passing through one of the spindles, and its appendages, and Fig. 4. a top view.

In each of the figures those parts which correspond are designated by the same letters of reference.

I place the spindles $a$, $b$, horizontally, and instead of the ordinary flyer I employ one which is cylindrical; this cylindrical part is shown at $c$, $c$; it is made of tin plate, or any other metal; at one end it is soldered to a pulley $d$, $d$, and at the other to a hoop, or ring $e$, $e$, which gives it a smooth and proper finish. The pulley $d$, $d$, is so formed as at the same time to constitute one end of the cylindrical flyer and to receive the tube or bearing which constitutes its support, and also that of one end of the spindle.

The pulley $i$, $i$, serves to drive the spindle, and this pulley is attached to a hub $j$, $j$, which is hollow, and allows the spindle to pass through it, while it can be drawn out for doffing, without disturbing the pulley.

To secure the spindle when in its place, it has a small pin projecting from it which passes into a notch or slot in the hub in the form of the letter L, the pin and notch operating like a bayonet lock, as shown separately at $j$, Fig. 2. There is a groove made along each spindle, as shown by the double lines, and a pin, or feather, projecting inward on the bore of the pulley $i$, $i$, enters this groove, thus connecting, and causing them to revolve together, but allowing the spindle to be drawn out readily. A sliding collar $z$; fits on to the spindle and has, like the whirl $i$, a feather or pin in its interior, which slides in the groove in the spindle, so that both are compelled to turn together. This collar has a clutch, or bayonet lock by which it is attached to the spool, in the same way in which the spindle and the hub $j$, are attached; this is to cause the spool to traverse back and forth as the covering is laid on it.

In Fig. 2. the collar, $g$, is shown detached from the spool, and in Fig. 3. as attached to it, $h$, $h$, being the spool and covering. The wheels of the wave rail, which governs the traversing motion of the spools are shown at $f$, $f$, Figs. 2 and 4. These have grooves on them adapted to suitable ways; $m$, $m$, Fig. 4. is the wave rail, extending from end to end of the machine. To this wave rail the proper motion is communicated by means of a rack and pinion, seen at $k$, $k$, Figs. 2 and 3. The action of this part of the apparatus does not differ from that in other machines for the same purpose.

The relative motions of the flyer, and of the spindle with its spool, which must be such that the spindle will run as much faster than the flyer as is necessary to take up the roving properly, and which has to be decreased as the quantity of roving increases, is effected by the well known differential movement seen at $n$, $n$, Fig. 1. which would be superfluous to describe.

The means of communicating motion to the drawing rollers, $o$, $o$, and to the other operative parts of the machine make no part of my invention, being the same with those in general use.

To enable the wave rail to cause the spools to traverse, and at the same time to allow the spool to be readily changed the pieces of metal $p$, $p$, are attached to the wave rail, by joint pins, as seen at $q$, Fig. 3; when turned up they take into a groove on the collars, $g$, but when turned down they are disengaged from it. The openings in the ends of the flyers through which the roving passes from the drawing rollers are in the centers of the front bearing of the flyers, $r$, $r$, $r$, at this end the flyer is sustained by and revolves in the bar or plate, $s$, $s$; the roving passes through the holes $r$, $r$, and out at the back end of this flyer at, $t$, and is conducted by a small tube or channel $u$, $u'$, into and through the flyer to its back end, to be laid upon the spool; the part of this tube, $u'$, is on the interior of the spool, the other part within it.

The rounded end $v$, $v$, of the flyer not only forms the tube, or perforated, bearing $r$, upon which it revolves, but also forms the support of one end of the spindle as before noticed, and as distinctly seen in the section, Fig. 3. The opposite end of the flyer, which is open, and is surrounded by the hoop or wing $e$, $e$, is supported by, and revolves upon a semicircular ring, or bearing, $w$, $w$, attached to a standard $x$. The semicircle $w$, may be replaced by friction rollers if preferred.

The most important part of my improvement is that which I am now about to describe, and this consists in the employment of what I have denominated centrifugal levers, of which I usually adopt two to each flyer, attaching them by screws, or joint pins to the face of the hoop, $e$, $e$, on the back end of the flyer, allowing them to turn freely on said screws, or joint pins. The manner of attaching them, and their operation will be understood from Fig. 5, which represents these levers, and the flanched end of the hoop $e$, $e$, constituting the open end of the flyer, to which they are affixed, the inner or small end of one of these centrifugal levers receives the thread in a hole, or loop, made in it for that purpose, as it proceeds from the small tube by which it is carried through the flyer. This loop, or opening, being seen at $y$, which gives a separate view of one of the levers. These levers being heaviest at their outer end, $z$, $z$, they expand by their centrifugal force, with a power proportioned to their velocity, causing their inner ends to press upon the spools, laying the yarn very hard and compact. By this construction a very high speed may be advantageously given to this instrument.

All that I claim as new, and wish to secure by Letters Patent is,

1. In manner of connecting the grooved spindle with the pulley $i$, and with its hub, and with the flyers, so that it can be drawn out for doffing, as herein fully shown.

2. The construction and employment of the centrifugal levers, made and operating in the way above described.

WM. MASON.

Witnesses:
W. THOMPSON,
LINTON THORN.